United States Patent [19]

Ahlert et al.

[11] Patent Number: 4,766,766

[45] Date of Patent: Aug. 30, 1988

[54] METHOD AND APPARATUS FOR PREPARING DOUGH

[75] Inventors: Dieter Ahlert, Ostercappeln; Konrad Böert, Melle; Armin Maiss, Ibbenbüren-Laggenbeck, all of Fed. Rep. of Germany

[73] Assignee: Dierks & Söhne GmbH & Co., KG, Osnabrueck, Fed. Rep. of Germany

[21] Appl. No.: 825,715

[22] Filed: Feb. 3, 1986

[30] Foreign Application Priority Data

Feb. 13, 1985 [DE] Fed. Rep. of Germany ....... 3504860

[51] Int. Cl.⁴ .......................... G01N 33/10; B28C 7/04
[52] U.S. Cl. ...................................... 73/169; 364/550; 366/76; 366/98; 426/231; 426/233
[58] Field of Search ................... 73/169, 54, 865.5, 73; 426/231, 233; 324/307; 364/550, 579; 366/8, 16, 17, 76, 98, 142

[56] References Cited

U.S. PATENT DOCUMENTS

| | | | |
|---|---|---|---|
| 2,673,463 | 3/1954 | Kimball | 73/169 |
| 3,169,395 | 2/1965 | Enoch et al. | 73/169 |
| 3,274,821 | 4/1973 | Szatmari et al. | 366/8 |
| 3,966,973 | 6/1976 | Henry | 73/169 |
| 4,084,442 | 4/1978 | Kay | 73/865.5 |
| 4,605,172 | 8/1986 | Ahlert | 241/33 |

FOREIGN PATENT DOCUMENTS

| | | | |
|---|---|---|---|
| 2429858 | 1/1976 | Fed. Rep. of Germany | 366/17 |
| 3005596 | 8/1981 | Fed. Rep. of Germany | 366/16 |
| 204434 | 12/1982 | Japan | 73/54 |
| 198928 | 11/1984 | Japan | 366/76 |
| 1204322 | 9/1970 | United Kingdom | 73/169 |
| 1393846 | 5/1975 | United Kingdom | 366/98 |
| 647117 | 2/1979 | U.S.S.R. | 366/8 |

Primary Examiner—Steven L. Stephan
Assistant Examiner—W. Morris Worth
Attorney, Agent, or Firm—Jordan and Hamburg

[57] ABSTRACT

A method of preparing dough for bread or fancy cakes can be carried out more quickly, precisely and reliably, dispensing with subjective judgements of the dough during and/or after the mixing, in such a manner that the state of the dough is monitored with a measuring probe and that values for the further addition of measured amounts of a main constituent such as flour or in particular water are determined from measured values which are obtained at quite specific characteristic measuring moments, in order to obtain an optimum dough which has the required properties in a reproducible manner, regardless of the varying capacity of the flour to absorb water. Apparatus designed for this purpose contains a detecting element to pick up the nature of the material being mixed or the dough and an electrical evaluation device which in turn acts on a proportioning device for the addition of a main constituent of the dough, such as water for example, but can also be used to control or regulate the temperature of the added water the speed of rotation of the tools and further machine parameters.

10 Claims, 6 Drawing Sheets

METHOD AND APPARATUS FOR PREPARING DOUGH

The invention relates to a method of preparing dough as well as to apparatus for carrying out the method.

It is true that in the preparation of dough for bread or fancy cakes, the development of the working methods and of the equipment for mixing, proportioning, discharging and further processing of the dough has led to the transfer of the physical labour to machines and hence also to an increase in productivity. The proportioning of the constituents, particularly of the main constituents flour and water, is, however, still a problem which requires experience and reliability of judgement. A constant proportioning of flour, water and other ingredients by no means leads to uniform doughs and uniform cakes and pastries, particularly as a result of the fluctuating quality of the flour. Accordingly, it is regularly necessary to test the dough by hand for its surface condition at the end of the mixing operation and then to add flour, water or other ingredients experimentally. The success of this trial-and-error method is by no means certain, however, and unusable batches of dough may be obtained even after several attempts at improvement.

Obviously, such a trial-and-error method is not only critical but also harmfully expensive both with regard to the working time of personnel and with regard to the mixing times resulting from the experimental further improvements and has a detrimental effect on the quality. This disadvantage is particularly clear during the production of bread in large bakeries in which the division of the dough into portions, the baking of the bread, cooling, packing and dispatch is already carried out in plants which work largely automatically, while the production of the dough lags far behind in this respect. In addition, the conventional method can scarcely be carried out with new, closed kneading machines.

Accordingly, it is the object of the invention to develop further the method of preparing dough for bread or fancy cakes and bread in the sense that the uncertainties of subjective judgements of the dough as well as the circumstances and duration of work as a result of further constituents added by trial and error can be reduced and doughs of great uniformity be achieved. In the same manner it is the object of the invention to develop improved apparatus for producing dough.

The present invention is a method of preparing dough wherein flour and water are loaded into a mixer as main constituents and thoroughly worked into a dough, the state of which is checked and altered by addition of a main constituent, the method including the steps of loading a main constituent in an amount which, as regards proportion, is below a minimum amount to be mixed, taking into consideration variable material properties, determining the state of the dough at least at a first measuring moment with reference to at least one measured value by means of a probe acted upon by the dough in the mixer, forming at least one measured-value difference with reference to a desired value for the state, which desired value is to be correlated with the measured value, adding to the dough a supplementary amount of the main constituent corresponding to the measured-value difference, and mixing the dough.

The present invention is also apparatus for carrying out the method defined in the last preceding paragraph, comprising a dough mixer, with a mixing vessel, a mixing drive therefor and proportioning devices for flour, water and/or other ingredients, and in which the mixing vessel is equipped with a detecting element for the state of the dough, which is connected to an electrical evaluation device which in turn controls at least one proportioning device.

In this respect, it has been found that the state of the dough can be reliably judged at an early stage of the thorough mixing as has been shown with reference to characteristic measurement curves. Clear connections between a lack of water or flour on the one hand and the associated traces of measurement curves on the other hand constitute—in conjunction with a high degree of reproducibility of these measurement curves—means for automatic control of the mixing process. This clarity and reproducibility exist even for dough mixtures which are initially mixed with a very short measure of a main constituent, for example of water. It is thus possible to ensure that a supplementary amount of this short measure constituent is added later and that there is not already an overmeasure which would have to be counterbalanced by other constituents.

Thus if a dough is first mixed, for example, with a proportion of water which represents a short measure in any case, that is to say for all types of flour in question, then it is possible to determine empirically from measured values at a very early period of the mixing, how much more water will be needed. Later measured values can then be used, in particular, for the fine correction. Fundamentally, such a step-by-step addition by means of proportioned measured values can also be carried out with the flour as the main constituent although the proportioning and introduction of water is particularly simple.

A prerequisite for such a measurement is a sufficiently sensitive and precise detecting element as explained, for example, in the DE-OS 33 36 218. An appropriately low-inertia measuring probe can not only pick up an average value of the reaction forces exerted on the probe by the mixed dough but also their rapid fluctuations so that the measurement signal can be broken down into a plurality of characteristic values such as the lower-frequency or uniform component and also the amplitudes and the frequency of higher frequency components. It has actually been found that a dough composition can deliver very informative higher frequency signals via such a probe although the mixing operation does not lead to granulated material but to a uniform viscous substance. The higher frequency signals which can be obtained in this case can even be utilized very well for the control of the preparation of the dough and in particular they can be used to determine the mixing time needed.

A temperature signal which can be picked up from the dough is also very informative as an important parameter for the measured values with regard to the state of the dough. A temperature measuring element can be fitted, in a particularly advantageous manner, to the front of the detecting element for the mechanical state of the dough so that a compact, uniform measuring system results which can be connected by one cable.

This measuring system is connected to an evaluation and control unit which determines the state of the dough with reference to measured values in order to determine values for measuring out a supplementary amount of the main constituent by comparison with a preset desired value or by any other suitable conversion determined by preliminary experiments and possibly also in order to control the further mixing time.

Since the control preferably starts from a set of reference or reaction values obtained empirically and should be able to be adapted as easily as possible, the evaluation device preferably contains a digital computer to which the measured values are fed in digitized form, typically therefore after conversion by an analogue-digital converter.

An embodiment of the present invention will now be described, by way of example, with reference to the accompanying drawings, in which.

Figure 1:
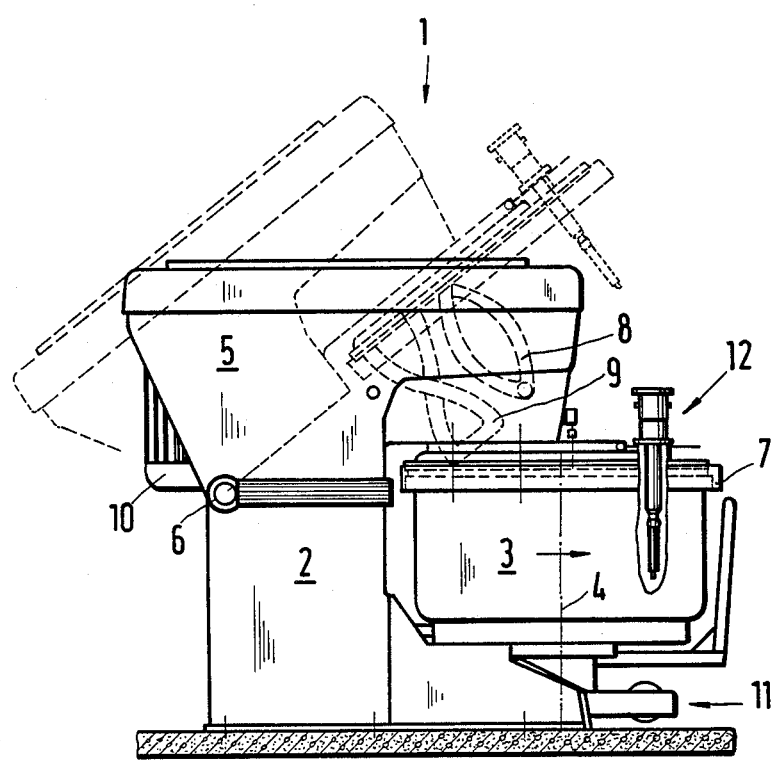
FIG. 1 shows a side elevation of apparatus for preparing dough.

The kneading and mixing machine designated as a whole by 1 in FIG. 1 has a construction which is predominantly known with a machine frame 2 which contains, inter alia, a rotary drive which enable a bowl 3 to be rotated about a central axis 4, the frame head 5 being connected to the machine frame 2 through an articulated joint 6 for pivoting upwards (into the position shown in broken lines).

The frame head 5 comprises a bowl hood 7 to cover the bowl and mixing tools 8, 9 which, in the working position, are rotated in the bowl about tool axes rotating parallel to the bowl axis 4 by a drive 10.

In a manner which is likewise known, the bowl 3 can be transported on its own roller chassis 11 so that it can be filled, emptied or conveyed for further processing elsewhere.

Figure 2:
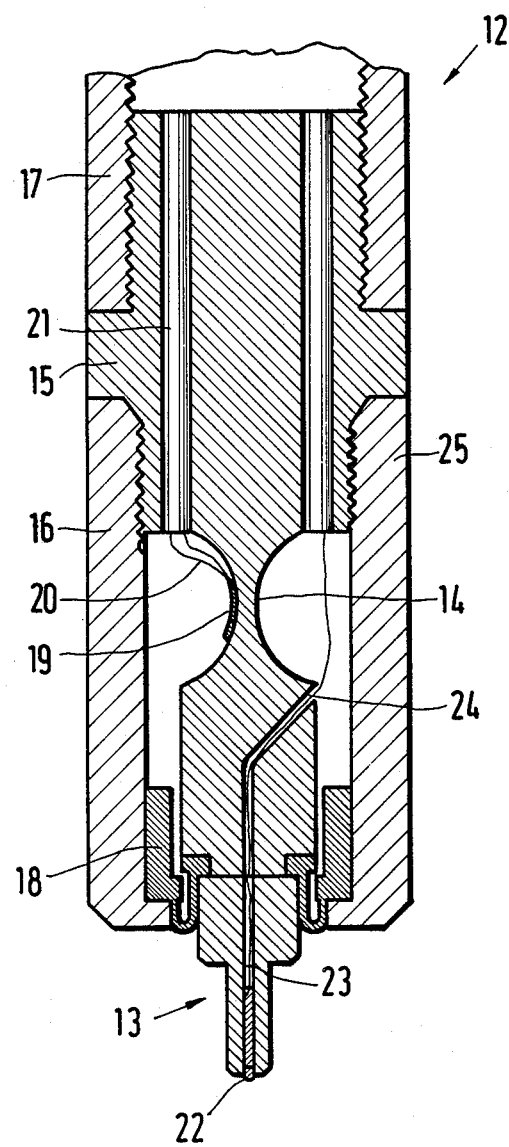
FIG. 2 shows an enlarged sectional elevation of a front probe member as shown in FIG. 1.

In a novel manner, the machine 1 includes a low-inertia probe which extends substantially parallel to the axis 4 downwardly into the bowl 3 from the hood 7 in a region clear of the tools 8, 9, in order to supply measured values about the state of the dough during the mixing. The lower tip of the probe 12, which is constructed in the form of a measured-value pick-up, can be seen in more detail in FIG. 2.

The probe 12 comprises a sensor 13 which projects downwards and which is connected to a support 15 through a narrowed flexing region 14. The support 15, together with tubular members 16, 17, forms a probe housing, the member 16 at the bottom forming a clearance gap for the sensor 13 and there being sealed off from the sensor 13 by a seal 18.

When the dough in the bowl brushes against the low-mass sensor during the mixing, the sensor can pick up not only average values for the viscosity of the dough but also very rapid impulse values resulting from the inhomogeneity of the dough, and both the amplitudes and the frequency of such impulse signals due to inhomogeneity can be very informative with regard to the state of the dough.

The actual measurement signal is obtained through strain gauges 19 which are stuck onto the detecting element 13 in the region 14 and which are connected to an evaluation device, not illustrated, via wiring 20 through a bore 21 in the support 15.

The sensor 13 also comprises a temperature pick-up in the form of an NTC (negative temperature coefficient) resistor 22 which is disposed at the lower mouth of a bore 23 which at first extends axially through the detecting element 13 and is then inclined to the axis. The electrical conductors for the NTC resistor extend through this bore 23 to an opening 24. The conductors are then taken further, past the flexing region of the detecting element and then upwards through a further bore 25 in the support so that they can be taken out through the hood 7 while being encapsulated with respect to the interior of the bowl. This temperature sensor 22 supplies a value for the temperature of the dough which is very informative particularly as a parameter for the state of the dough.

Figure 3:
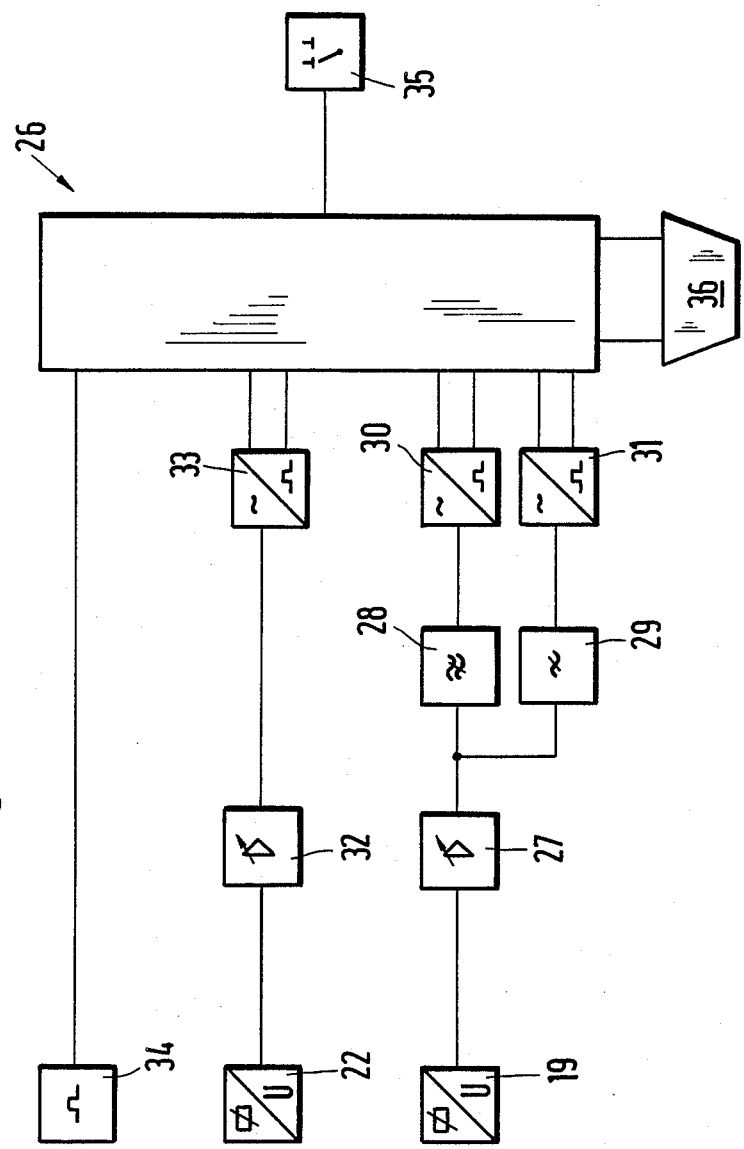
FIG. 3 is a block circuit diagram for the electrical control of the method of preparing dough.

The associated control section of the apparatus for preparing dough can be seen from FIG. 3. A central evaluation device which comprises a digital computer section in particular, is connected, at the input side, to a plurality of primary elements. Thus the strain gauge system 19 is taken, through an amplifier 27, in parallel, to two filters, namely a high-pass filter 28 and a low-pass filter 29, which provide a separation between the lower frequency signals and the higher frequency signals. The resulting signal amplitudes are converted into digital signals in analogue-digital converters 30 and 31 respectively and introduced into the evaluation device 26.

A second signal path leads from the temperature sensor 22 through an amplifier 32 and a further analogue-digital converter 33, likewise into the evaluation device 26. Finally, a water meter 34 is disposed in a water pipe (not illustrated in FIG. 1) leading to the bowl 3 and supplies a measured value for the water fed in which is fed to the evaluation device 26. In order to control the temperature of the material being mixed, a water meter like the meter 34 can be provided in a second water supply pipe at a colder temperature close to 0° C. ("ice water"), in order to enable the mixing temperature to be adjusted.

From the value fed in, control instructions are determined whereby a switching device 35 is controlled which opens and closes a valve in the water supply pipe to the bowl (in which the water meter 34 is also disposed). If there is a second water supply pipe, the control can deliver separate measured values for this. A mixing value may, however, also be controlled to a desired temperature of the water. Further connected to the evaluation device 26 is an input keyboard 36 with which previously known data, time values, control programs, quantities and the like can be fed in.

For the production of a bread dough, the mode of operation of the apparatus is directed to producing a dough of the required quality from flour, water and other ingredients in the correct proportions. Conventionally, this presupposed that after a mixing operation of 5 to 7 minutes for example, conclusions regarding the consistency of the dough and means for improving it were drawn subjectively from the superficial appearance of the dough, from the resistance of the dough to a hand reaching into it and from the stickiness. In contrast to this, measured values, which are representative of the state of the dough and enable specific values for the necessary variations in the mixture to be given with satisfactory reliability, are obtained from the material being mixed, by the probe 19 during the mixing operation, beginning at a very early moment. This applies even to the case where the initial values for the mixture lie outside the forseeable range of the mixture.

Thus it is possible to introduce an amount of the main constituent of the dough, that is to say flour and water in the case of bread dough, which is reduced in such a manner that some of this main constituent has to be added later in any case or that none of the other main constituent has to be added later in any circumtances. Thus the control is simplified so that only one main constituent has to be supplied later. From the point of view of supplying and measuring out as well as possibly also from the point of view of controlling the temperature to adjust the temperature of the material being mixed, water is usually to be preferred here.

Thus at the beginning of the mixing in the bowl 3, a dough is mixed having a reduced yield or a reduced (water) absorption which is below the absorption in question for all the types of flour in question here.

Now it is found that soon after the beginning of the mixing, both the lower frequency values of the signals delivered by the probe 19 and the amplitudes of the high frequency signals or impulse signals rise rapidly and reach a first maximum after a mixing time of about 35 to 40 sec. This first maximum value can already be taken as characteristic of the mixture. The lower frequency signal value, in particular, indicates a measure of the viscosity of the dough which is influenced by the addition of water. Fundamentally a usable dough, which can be used after a mixing period of 5 to 7 minutes for example, can be achieved already from this value and a single addition of water.

Preferably, however, provision is made to provide the first addition of water again in a reduced amount and to provide a further measured evaluation after the first addition of water, after about 75 to 80 seconds from the beginning of mixing. In the same sense, a third measurement and a further correction may be provided at a third measurement moment after 100 seconds for example from the beginning of mixing.

Thus a dough with a preset yield can be achieved which is not too firm and not too loose and which does not cause difficulties in handling in following machines as a result of a sticky surface.

The precision of the measurement evaluation is increased as a result of the fact that the temperature of the dough is also measured by the temperature sensor at the tip of the probe, as an important parameter indicative of the state of the dough. The difference between the measured temperature and a preset reference temperature is multiplied by valuation factors and added to the measured values in order to compensate for variations in the measured values caused purely by temperature. At the same time, a temperature control of the dough is thus rendered possible, for example if the temperature of added water is regulated through a mixing valve and two pipelines connected to this with colder and warmer water (more precisely "ice water" and "cold water").

Figure 4:
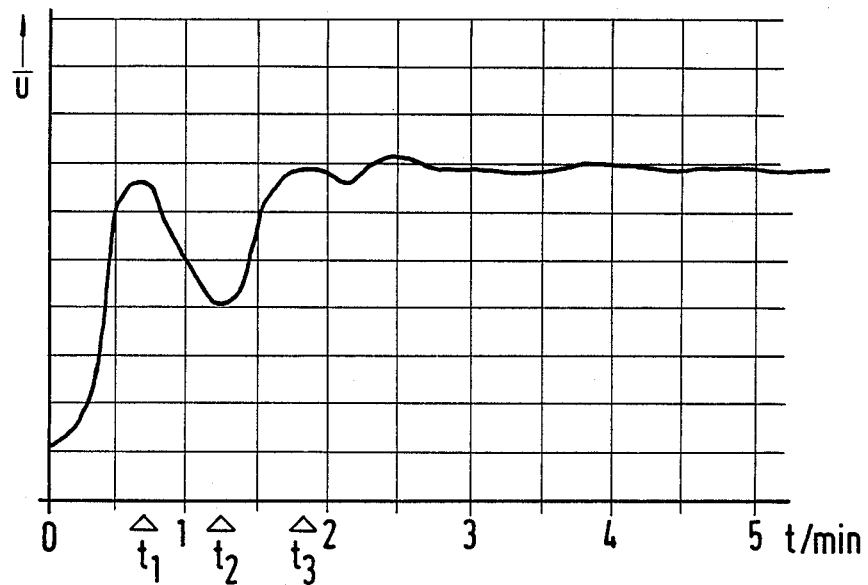
FIGS. 4, 5 and 6 show time traces of measurement curves showing average value and amplitude of oscillation for the control of the method of preparing dough.
Figure 4:
Figure 5:
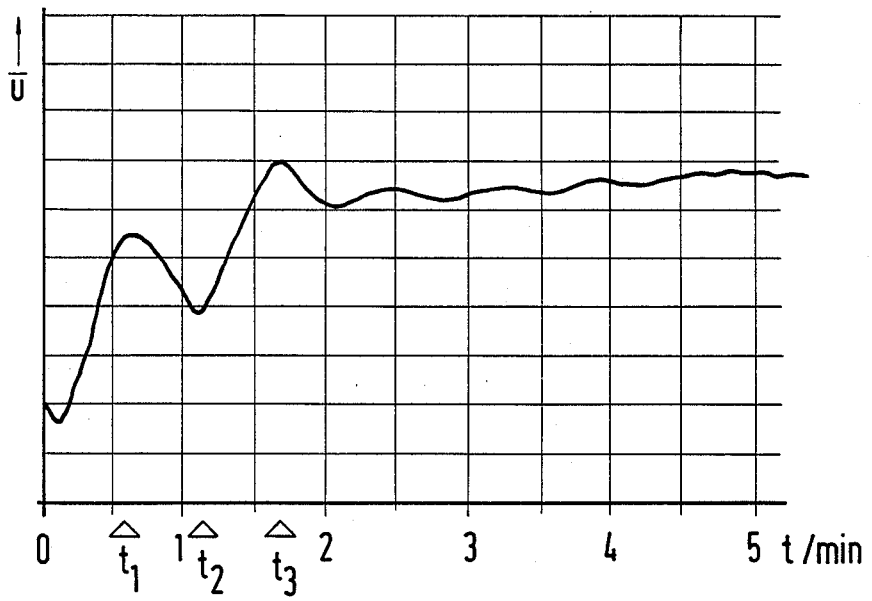
Figure 5:
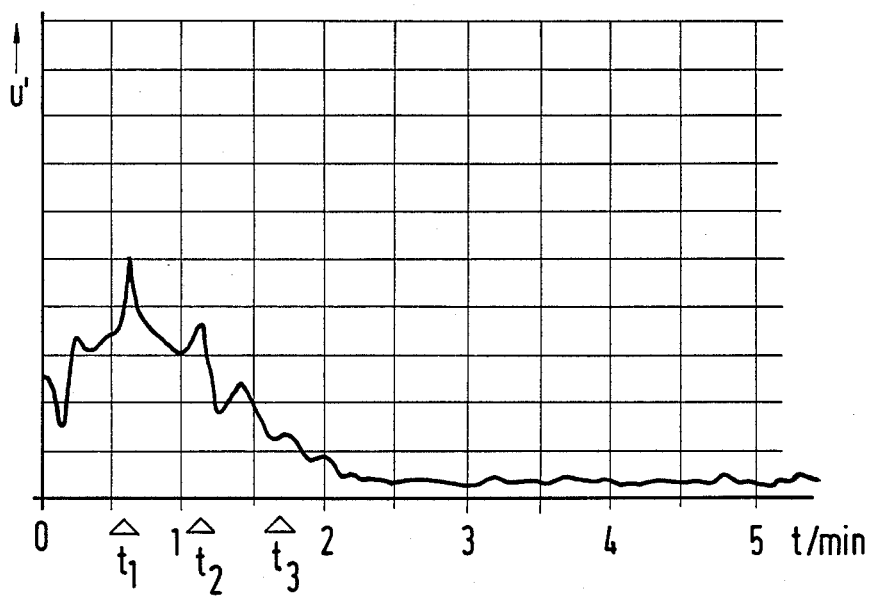
Figure 6:
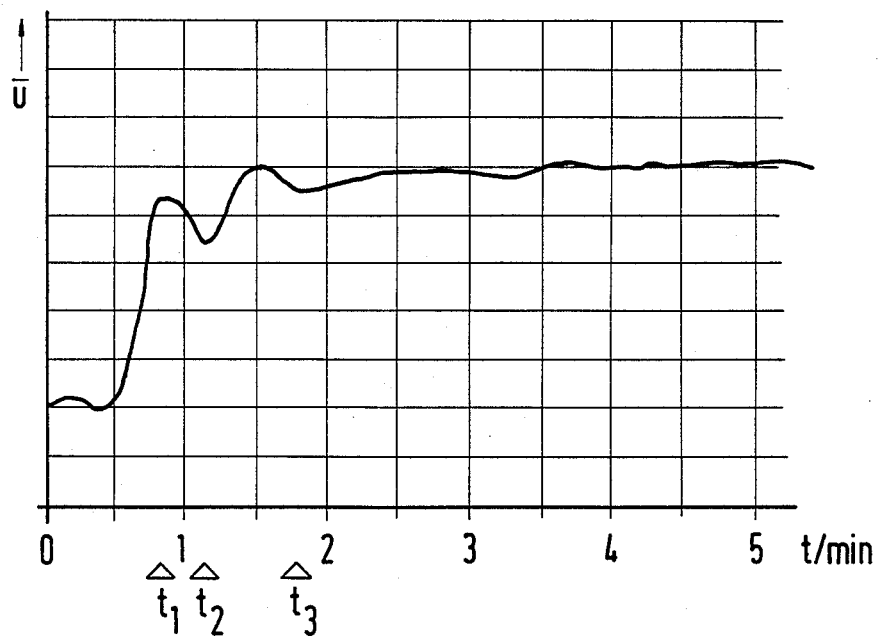
Figure 6:
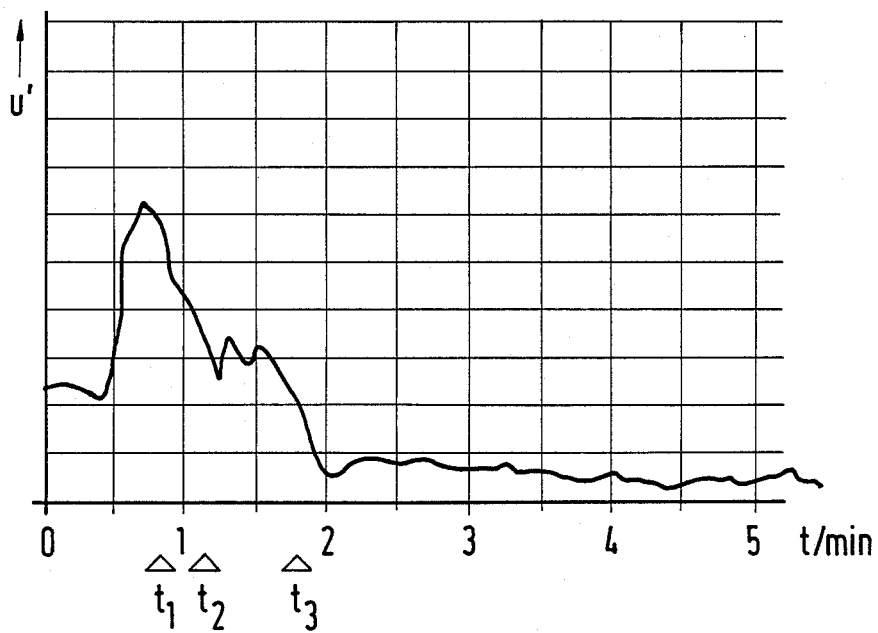

In FIGS. 4 to 6, three time traces of measurement curves for the state of the dough in the course of the mixing are illustrated (with the addition of water in the meantime). The lower-frequency mean value $\bar{u}$ of the measurement signal is shown in each of the time graphs with u' below it.

The mean value $\bar{u}$ shows that the dough has a maximum viscosity after about 35 to 40 seconds in each case and with it a first steady-state range. At the same time, the impulse amplitudes u' likewise have a very high value. This indicates, on the one hand a high viscosity and on the other hand a great inhomogeneity in the dough which allows the conclusion to be drawn that the amount of water present is distributed in the flour and has formed a viscous substance but that the distribution is not yet so homogeneous that the mixing operation could be regarded as terminated. In this period, which is designated by $t_1$ in the graphs, how much water should be added and at what temperature is primarily determined from $\bar{u}$ and the associated temperature value (not illustrated). This amount of water is released by opening the valve through the control 35 while the water meter 34 carries out a check. The computer section then controls the closing of the valve again as soon as the predetermined measured amount is reached.

A further drop in the measurement curves then occurs in the time graphs with a renewed characteristic steady-state value at the moment $t_2$ at about 70 to 80 seconds, which can be used for a finer correction of the water proportioning. Finally, a third measuring moment $t_3$ is set at a mixing time of 2 to 2.5 minutes, when another fine correction, that is to say a further addition of water, can be provided.

With a total mixing time of 5 to 6 minutes, these corrections occur in the first half of the mixing time. Thus the mixing time is not extended by corrections to the dough yield in the meantime, in contrast to the earlier hand-monitored method of preparing dough wherein checking, correction and renewed mixing were only carried out at the end of the mixing time. This involves a considerable increase in output for existing machines.

The controllability and precision of the mixing operation is equally important. A constant dough which can be further processed satisfactorily and is capable of being baked is achieved and the possibility that an inadequate dough, which is too firm or too sticky, may have to be further processed in view of the already existing mixing time or that a batch of dough may even have to be rejected as irreparably unusable, is avoided.

Such control of the preparation of dough presupposes, apart from the above-mentioned general knowledge, characteristic fields or data fields which have to be correlated with the measured values and which have to be determined experimentally at least in a pilot project. A digital computer with its store possibilities is particularly suitable for being able to preset or even alter such characteristic values, weighting factors and the like easily.

During the evaluation, the components of the measurement signal in the form of impulses are also taken into consideration. The inhomogeneity of the material influences the viscosity for example, so that at the measuring moments $t_1$, $t_2$ and $t_3$, a correction value for $\bar{u}$ resulting from u' can be fed in with reference to the impulse amplitudes. The frequencies which typically develop from very low frequencies to considerably higher frequencies in the region of the first measurement $t_1$, which is related to the increasing homogeneity, are also very informative. The impulse amplitudes are further very informative for the progress of the mixing operation. The impulse amplitudes enable the duration of the mixing operation to be determined.

The impulse amplitudes u' are also suitable for determining the precise measuring moment $t_3$ as well as the termination of the mixing operation. From this point of view, a sufficiently low drop in the impulse amplitudes is determined for $t_3$ while the end of the mixing operation is determined from the renewed rise in the amplitudes to a constant level.

The moments $t_1$ and $t_2$ can also be determined advantageously depending on the measured values, namely depending on $\bar{u}$. Thus $t_1$ is determined as a result of the fact that a maximum of $\bar{u}$ is exceeded with a drop in the mixing value. Conversely $t_2$ is fixed after a following minimum has been exceeded.

Finally, it will be understood that further ingredients, controlled in nature and amount, can be introduced depending on the measured values. In the case of fancy cakes and bread in particular, raising agents or other ingredients such as milk, fat, sugar or eggs may be added depending on the progress of the mixing operation.

A large number of machines suitable for mixing and kneading are to be understood under the term mixer above. Thus machines designated as "kneaders" are frequently in a position to mix. In particular, closed "line kneaders" with integrated kneading vessel, filling device, proportioning devices and emptying device should also be included here.

We claim:

1. A method of preparing dough comprising the steps of loading dough constituents into a mixer in an amount in which one of the constituents is below a minimum amount to be mixed to form the completed dough, mixing the loaded dough constituents in said mixer, measuring reaction forces of the dough with a measuring probe which penetrates into the dough during the mixing, utilizing said measuring probe to produce a first low-frequency signal indicative of the viscosity of the dough being mixed and a second higher frequency signal indicative of the inhomogeneity of the dough being mixed, monitoring said first and second signals to determine respective first and second initial maximum values of said first and second signals, comparing said first and second initial maximum values of said first and second signals with known desired values, producing a difference value representing the difference between said initial maximum values and said known desired values, and adding to the dough being mixed an additional amount of said one constituent determined by the magnitude of said difference values.

2. A method according to claim 1 further comprising the step of continuing to produce said first and second signals as said additional amount of said one constituent is continuously mixed into said dough, continuing said monitoring of said first and second signals to determine respective third and fourth maximum values of said first and second signals, comparing said third and fourth maximum values with second known desired values, producing a second difference value representing the difference between said third and fourth maximum values and said second known desired values, and adding to said dough being mixed a second additional amount of said one constituent determined by the magnitude of said second difference value.

3. A method according to claim 1 further comprising measuring the temperature of said dough as the dough is being mixed in said mixer, and utilizing said measured temperature to modify said difference value such that the temperature of the dough being mixed thereby, in part, controls the magnitude of said additional amount of said one constituent added to said dough being mixed.

4. A method according to claim 1, wherein said one constituent is a liquid substance, said first and second initial maximum values being indicative that the liquid substance has been distributed in the dough to form a viscous substance and that the dough is inhomogeneous.

5. A method according to claim 1, wherein said one constituent is water, and said step of adding an additional amount of water resulting in reducing the values of said first and second signals to a value lower than the respective first and second initial maximum values.

6. Apparatus for mixing dough comprising a mixing vessel receiving dough contituents to be mixed to form a dough product, means operable in said vessel for mixing said dough constituents in said vessel, measuring probe means operable in said vessel to produce a first low frequency signal indicative of the viscosity of the dough being mixed and a second higher frequency signal indicative of the inhomogeneity of the dough being mixed, monitoring means for monitoring said first and second signals, input means for inputting known desired values of said first and second signals, evaluation means operatively connected between said input means and said monitoring means for comparing said first and second signals with said known desired values and for producing a difference value signal representing the difference between said first and second signals and said known desired values, control means for adding a metered amount of one of said dough constituents to said vessel, said evaluation means being operably connected to said control means such that said control means introduces a metered amount of said one dough constituent to said vessel in response to said difference value signal.

7. Apparatus according to claim 6, wherein said measuring probe means comprises strain gauge means and filter means which separate said low frequency signals and said higher frequency signals picked up by said strain gauge means.

8. Apparatus according to claim 7, wherein said monitoring means and said evaluation means comprises a digital computer.

9. Apparatus according to claim 8, wherein said measuring probe means comprises analog-digital converter means between said filter means and said digital computer.

10. Apparatus according to claim 9, wherein said measuring probe means further comprises temperature sensing means for measuring the temperature of the dough being mixed in said vessel and for feeding a temperature signal to said digital computer.

* * * * *